INVENTOR.
DAVID ATLAS

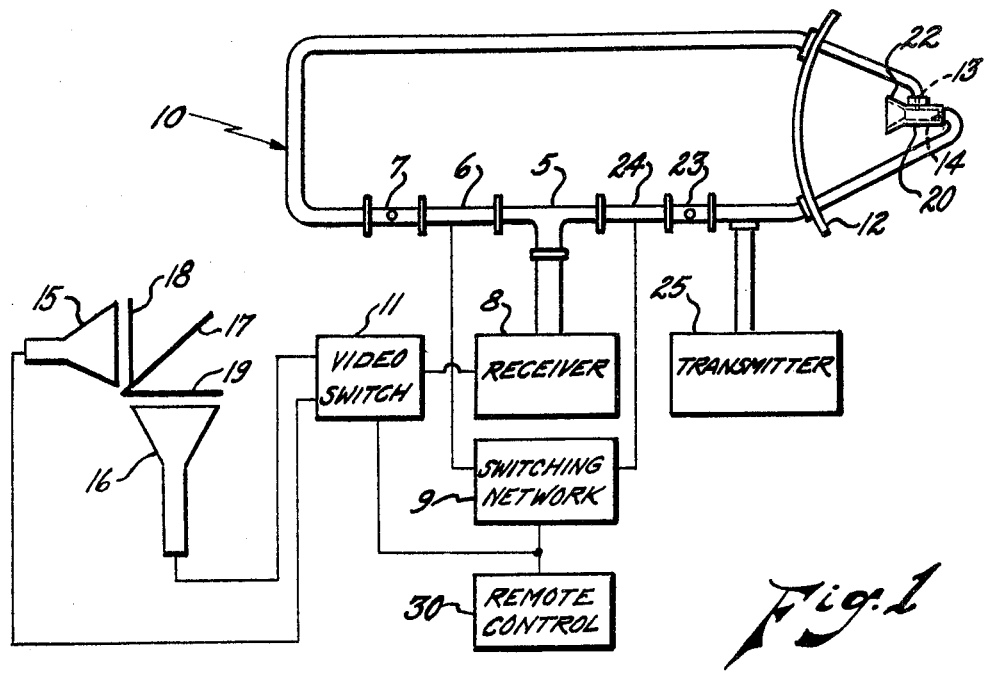
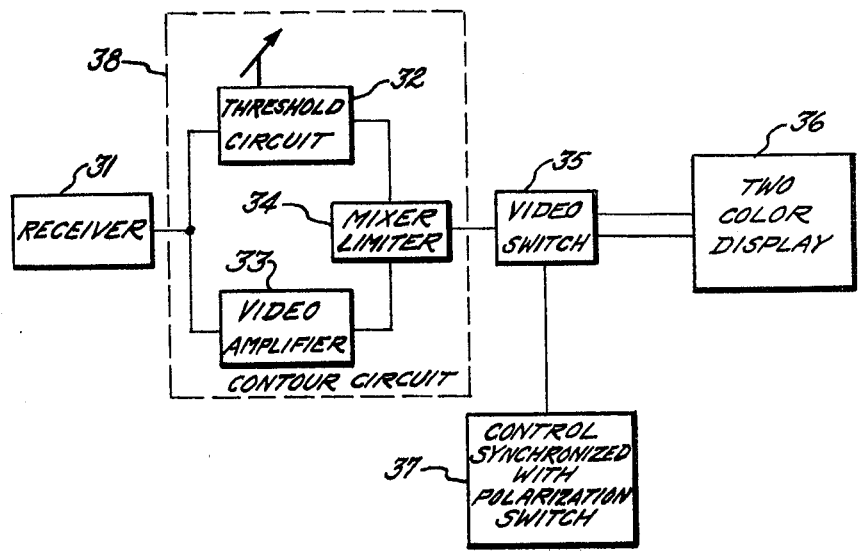

United States Patent Office 3,268,891
Patented August 23, 1966

3,268,891
STORM POLARIZATION ANALYSIS AND RADAR-CONTROLLED AIRCRAFT GUIDANCE
David Atlas, Waban, Mass., assignor to the United States of America as represented by the Secretary of the Air Force
Filed June 15, 1964, Ser. No. 375,403
15 Claims. (Cl. 343—5)

The invention described herein may be manufactured and used by or for the U.S. Government for governmental purposes without payment to me of any royalty thereon.

This invention relates to the analysis of storm polarization, and to the radar-controlled guidance of aircraft, and more particularly to methods and apparatus that will effectively guide aircraft through storms.

When echo signals return to a radar antenna they arrive at the receiver of the radar system in a phase relationship that is 180 degrees out of phase with the transmitted signal. Thus, if the signal transmitted is right-circularly polarized, the return echo will be left-circularly polarized. The described behavior is characteristic of isotropic targets, such as rain, which respond in uniform fashion to linear polarization of any orientation. Other targets, such as aircraft, are nonisotropic and have a preferred response to signals of a particular orientation. An aircraft will therefore cause return echoes to be elliptically polarized, if the signals originally transmitted are circularly polarized. Elliptically polarized signals, however, can be broken up into two parts, namely, a right-circularly polarized part and a left-circularly polarized part.

Utilizing the above principles, radar systems normally transmit right circularly polarized signals and receive right circularly polarized return echoes only. Echoes from rain which would be left circularly polarized are effectively ignored. Echoes from aircraft being elliptically polarized will have a right circularly polarized component which will be received and a left circularly polarized component which will be ignored. Such a system will obviously be able to display the aircraft with much greater clarity than it could if the aircraft were obscured by a simultaneous display of the rain.

Regrettably such a system loses its weather mapping ability completely. It becomes entirely possible that a radar controller, employing the information available to him in such a display, could vector an aircraft into a storm rather than around it.

The present invention overcomes these objections by receiving alternately right and left circular polarized echoes while transmitting right circularly polarized energy continuously. While receiving left circularly polarized echoes, signals from nonisotropic as well as signals from isotropic targets appear. While receiving right circularly polarized echoes, only that portion of elliptically polarized echoes from nonisotropic targets, that are right circular polarized, appear.

The echo signals appearing when the receiver is in either the left or right circular polarization mode are kept separated. By synchronizing the display of the two separate signals such that signals appear on the same display but in differing intensities or color, the aircraft, readily distinguishable from the rain, can be easily vectored around or through a storm.

Large drops of rain, wet snowflakes, and hail are not isotropic. Consequently, they as an aircraft, will cause echo signals to return elliptically polarized. If a radar is permitted to scan a given area—when rain is encountered, the echo displayed will be left circularly polarized completely; as hail is encountered, a portion of the display will shift to right circularly polarized reception. Measuring this shift from left to right circularly polarized reception is a measure of the non-sphericity of the particles encountered in the atmosphere—i.e. the quantum of hail or wet snow to be expected in areas displayed. Again such knowledge is indispensable to the avoidance of such storm hazards in the guidance of aircraft.

A contour mapping circuit can be inserted to measure quantitatively the non-sphericity of the particles. Such a circuit places a hole in the core of the storm where the intensity exceeds a preset controllable level on left circular polarization. The echo return on right circular polarization can then be matched to the size of the contour hole on left circular polarization providing a measure of the cancellation on left circular polarization, i.e. the magnitude of the shift from left to right circularly polarized reception.

A measure of the sphericity of particles within an area surveyed can also be accomplished by switching the antenna from receiving linear polarization to receiving circular polarization alternately. The echo area remaining on circular polarization is fitted to the contour hole on linear polarization by sequentially changing the contour level providing a semi-quantitative measure of the sphericity of the particles.

With the radar beam fixed in space or scanning slowly with respect to the frequency of polarization modulation, echo intensity can be measured automatically and alternately on both polarizations at any number of points in the storm region with the output displayed on a meter or similar quantitative measuring device.

The present invention also permits transmission of linear polarized signals and the sampling of either parallel or cross-linear polarized components, either constantly or alternately at a variable rate. The cross-linear-polarized component is also a measure of the non-sphericity of particles in the atmosphere. Additionally, the above information, together with the parallel component measurements of echo intensities, will permit a determination of the orientation of the particles. The rapid modulation from left to right circular polarization or from linear to circular polarization will also indicate lightning discharges, embedded in regions of precipitation, having a linearly preferred response.

An object therefore of this invention is to provide novel methods and apparatus for the guidance of aircraft through storms.

Another object of this invention is to provide a radar-controlled aircraft guidance system having weather mapping capability.

Another object of this invention is to provide methods and means for measuring the quantity of non-spherical particles in a storm region.

Still another object of this invention is to provide methods and means for determining the orientation of such non-spherical particles.

Another object of this invention is to provide method and means of displaying lightning discharges embedded in a region of precipitation particles.

Other objects and features of this invention will become more apparent by reference to the following description taken in conjunction with the accompanying drawings in which:

FIG. 1 shows a block diagram of an embodiment of this invention;

FIG. 2 is a block diagram showing the insertion of a contour mapping circuit in the above circuit;

Figure 3:
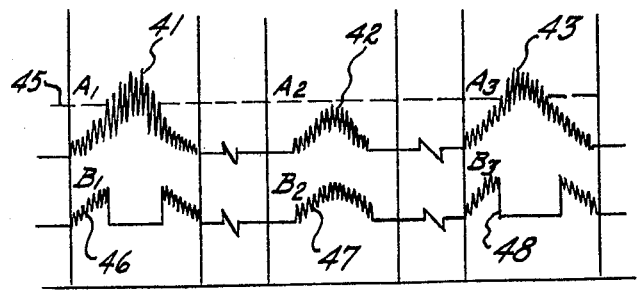
Figure 4:
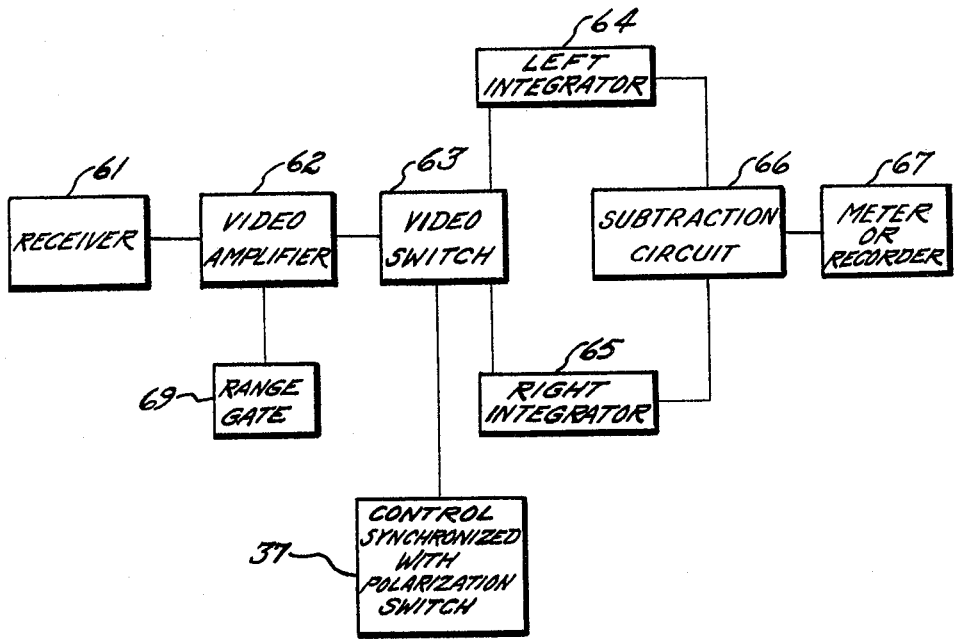

FIG. 3—two curves showing the matching of polarization outputs related to circuitry of FIG. 2; and FIG. 4 is a block diagram showing a measurement scheme for determining the cancellation of either polarizations.

In FIG. 1 reference numeral 10 designates a hollow rectangular structure adapted to receive energy from a transmitter 25 and release such energy by way of horn 22 and parabolic reflector 12. Returning pulse echoes enter port 13 or port 14 and travel to receiver 8 by way of loop 10 and magic tee 5.

Still referring to FIG. 1, transmitter 25 transmits R. F. energy through port 14. Transducer 20 preferably has a quarter wave plate that is disposed in parallelism with (or at 45 degrees to) the linear radiation coming into the transducer, and operates to direct energy out of feed horn 22 to dish 12, where it is reflected toward targets in the atmosphere.

Echoes returning from the atmosphere are polarized either left or right circularly, as explained previously. Echoes that are left-circularly polarized are directed by transducer 20 to port 13 and those that are right-circularly polarized are directed to port 14.

Radio frequency switches 24 and 6 are protected by transmit-receive tubes 23 and 7, respectively. Remote control 30, acting through switching network 9, controls switches 24 and 6 in such manner that when one switch is open the other is closed. Remote control 30 therefore can select the signal for receiver 8 to see: that which is left-circularly polarized at port 13 and passes through closed switch 6 to magic tee 5, or that which is right-circularly polarized at port 14 and passes through closed switch 24 to magic tee 5.

Received signals are processed through video switch 11 which is synchronized with the switching of switching network 9. Switching is arranged such that left circularly polarized signals will appear on cathode ray tube 16 and right circularly polarized signals appear on cathode ray tube 15. Filter 18 will impart a distinguishing color to right circularly polarized signals that can be seen on partially silvered mirror 17. Filter 19 will impart a different distinguishing color to left circularly polarized signals appearing on partially silvered mirror 17. Echoes that are right circularly polarized and representative of nonisotropic targets and echoes that are left circularly polarized and chiefly representative of isotropic targets both appear on common display 17 but in distinguishing colors.

Referring once again to transducer 20, the quarter wave plate referred to earlier could be vertically aligned with the linearly polarized energy emanating from port 14. In this mode of operation, return echoes that were vertically polarized would appear at port 14 and horizontally polarized signals would appear at port 13. If this transducer were equipped with a quarter wave plate, rotatable from one alignment to the other, reception of linearly polarized signals and circularly polarized signals alternatively could be accomplished. Alternate reception of linear and circularly polarized signals, separate processing of them, and a combined display as explained when right and left circularly polarized signals are received would provide a display that would also distinguish between nonisotropic and isotropic targets.

Many substitutions in the circuitry of FIG. 1 are possible without departing from the scope of the present invention. For instance, two separate receivers can be used, one connected to port 13 and the other connected to port 14. Such a change would obviate the need for switches 6 and 24, switching network 9, video switch 11, remote control 30 and magic tee 5. A single tube might also be substituted for the two tubes 15 and 16, provided with a dual color system. Similarly, an ordinary display tube wherein the intensity of the beam is modulated in accordance with left or right circularly polarized signals might also be substituted such that left circularly polarized signals would appear in one shade of grey and right circularly polarized signals would appear in another shade of grey. Another alternative would be to pass video corresponding to left circularly polarized signals through a coding circuit to electronically code the pattern of background storm, while displaying right circularly polarized signals at full brilliance. An even more sophisticated system would employ an electronic storage tube in which left circularly polarized signals would be stored and right circularly polarized signals subtracted from them and their difference displayed. This latter process would display the region of electromagnetically spherical particles around a black region representing the area of non-spherical particles.

FIGS. 2 and 3 show two schemes for determining the quantitative difference between signals returning left circularly polarized and signals returning right circularly polarized. As pointed out earlier, the difference between the intensity of the two return signals is a quantitative measure of the sphericity of the particles in space.

FIG. 3 shows several waveforms. Waveforms 41, 42 and 43 are signals applied to contour mapping circuit 38. Waveforms 46, 47 and 48 are output signals of contour mapping circuit 38. Waveforms 41 and 43 represent signals that are left circularly polarized, while 42 represents signals that are right circularly polarized. Line 45 represents the threshold level. The difference in signal intensity between 41 and 42 is the cancellation ratio and a measure of sphericity of particles in the atmosphere.

Referring once more to FIG. 2, the contour mapping circuit 38 is described in greater detail in U.S. Reissue Patent 24,084. As signal 41, FIG. 3, is applied to contour mapping circuit 38, that portion which exceeds threshold level 45, is strongly amplified, inverted, and mixed with original signal 41 in such a manner that the output of contour mapping circuit is zero or slightly negative as indicated in 46. Waveform 42 is assumed below threshold level 45 and remains unaltered in the circuit as indicated by curve 47.

The output of contour mapping circuit 38 is then applied to display 36. The echoes corresponding to left circular polarization appear as a ring of echoes surrounding a "hole," in which region the signals actually exceed the threshold level. Left circularly polarized signals are shown in a characteristic color; right circularly polarized signals appear in a second color. By sequentially varying the threshold level on successive scans of the radar beam across the storm region, the size of the area on the display in one color may be varied until the second color area fits into the hole in the first color display. The corresponding threshold level, calibrated in terms of echo power level, represents the area of signal cancellation on right circular polarization and consequently the sphericity of particles in the atmosphere.

If a two receiver system were used, as suggested above, that which appears on right circularly polarized receiver could be inverted and subtracted from the output of the left circularly polarized receiver.

Direct subtraction can also be accomplished with a single receiver if electrostatic or magnetic storage media are used. This could be accomplished by storing the left circularly polarized signal then erasing with the subseqently right circularly polarized signal reading out simultaneously with the erase operation on a storage tube such as Radechon made by Raytheon Co. Here, the display would be an area of left circularly polarized signals surrounding a null region corresponding to right circularly polarized signals.

FIG. 4 shows a circuit that can be employed to obtain a more exact measure of the cancellation ratio and consequently sphericity of particles in the atmosphere. During successive pulse periods, where receiver 61, FIG. 4, is alternately sampling left and right circularly polarized return echoes, and video amplifier 62 is gated by range gate 69, the signal is switched from left integrator 64 to right integrator 65 by video switch 63 and remote control 37. The difference in output of the two integrators 64 and 65 is measured by subtraction circuit 66 and read-on meter 67, providing a measure of the cancellation ratio. During this process the antenna beam must be moved slowly or fixed to provide the integrator enough time to take a representative sample of pulses. The range gate may be programmed in range to provide a range cross section through the storm area. An electronic or magnetic storage device might be used in place of the left and right integrators. The signal corresponding to the polarization difference may then be obtained at all ranges and quantitatively displayed.

While I have described the above principle of my invention in connection with specific apparatus, it is to be clearly understood that this description is only made by way of example and not as a limitation on the scope of my invention as set forth in the objects thereof and in the accompanying claims.

What is claimed is:

1. The method of guiding aircraft through storms which method includes the steps of radiating polarized energy into the atmosphere, receiving alternately samples of return echoes that are oppositely polarized, processing said samples of oppositely polarized return echoes separately, storing one of said samples of oppositely polarized return echoes, subtracting the alternate samples of polarized return echoes from said stored samples and displaying the difference of said subtraction.

2. A method as claimed in claim 1 wherein the radiated energy is right circularly polarized and alternatively sampled return echoes are left circularly polarized and right circularly polarized.

3. A method as claimed in claim 1 wherein the radiated energy is linearly polarized and the sampled return echoes alternatively received are circularly polarized and linearly polarized.

4. A method as claimed in claim 2 wherein the separate signals are displayed in distinguishing colors on a common screen.

5. A method as claimed in claim 2 wherein the separate signals are displayed in distinguishing intensities within a single cathode ray tube.

6. A method as described in claim 1 which further includes the step of contour mapping of received signals.

7. A method of determining the sphericity of particles in the atmosphere, which method includes the steps of radiating polarized energy into the atmosphere, alternately sampling return echoes having different polarizations, contour mapping said sampled return echoes, displaying said sampled echoes in distinguishing colors such that a direct comparison can be drawn between the magnitude of the individual displays for measurement purposes, and selectively varying the magnitude of one of said individual displays to attain a predetermined area thereby determining said sphericity of said particles.

8. A method of determining the sphericity of particles in the atmosphere, which method includes the steps of radiating polarized energy into the atmosphere, sampling return echoes alternately at differing polarized orientations, gating said signals, integrating said signals separately, subtracting said separately integrated signals from one another metering the difference in said integrated signals providing a measure of the sphericity of said particles in the atmosphere represented by said signals.

9. Apparatus for guiding aircraft through storms comprising polarized radiating means directing radiant energy toward said aircraft and said storm, dual opposed polarized means for receiving return echoes from said aircraft and storm, first switch means to alternately feed said dual opposed receiver means said return echoes in accordance with the polarization of said return echoes, video switching means receiving the output of said receiver means, said video switching means and said first switch means having a common remote control to provide synchronism of said switches, display means receiving the output from said video switching means for displaying separately sampled oppositely polarized return echoes together in distinguishing character.

10. Apparatus as described in claim 9 wherein said radiating means includes a dual mode transducer in the form of a quarter wave plate rotatable with respect to an opposed port, for the emission of linear polarized energy, and arranged normal to a second port, said port arrangement providing means for sampling return echoes that are differently polarized.

11. Apparatus as described in claim 10 wherein said transmitted energy is right circularly polarized and said sampled returns are alternately left circularly polarized and right circularly polarized.

12. Apparatus as described in claim 11 wherein said display means includes for each of said separately sampled oppositely polarized return echoes, separate cathode ray tube means, distinguishing color filter means, half silvered mirror means; said cathode ray tubes, said filters, and said half silvered mirror arranged such that the separate displays appearing on said cathode ray tubes appear in different colors on said half silvered screen.

13. Apparatus for determining sphericity of particles in the atmosphere comprising right circularly polarized transmitting means directing energy toward said particles, receiver means for alternately sampling left and right circularly polarized return echoes from said particles, video amplifier means receiving said left and right return echoes, means for range gating said video amplifier means, video switch means receiving the output from said video amplifier means, remote control means synchronously switching said video switch in synchronism with said sampling of left and right circularly polarized return echoes, left integrator means, right integrator means, said left and right integrator means being connected to the output of said video switch means and respectively receiving left and right video amplified return echoes in accordance with said synchronous switching, subtraction means, said integrator means applying their output simultaneously to said subtraction means, meter means connected to the output of said subtraction means, said meter means indicating the difference between the signals appearing at said subtraction means and thereby determining sphericity of particles in the atmosphere.

14. A system for guiding aircraft through storms comprising transmitter means generating radiant energy, antenna means receiving said radiant energy from said transmitter means and operating to radiate right circularly polarized energy toward said aircraft and storm, said antenna means also receiving right and left circularly polarized return echoes from said aircraft and storm, means to direct said right circularly polarized return echoes through a first path and said left circularly polarized echoes through a second path, switch means in each of said paths to alternately feed said right and left circularly polarized return echoes to receiver means, a video switch having a single input terminal and two output terminals, said input terminal receiving the output from said receiver, means to synchronize said video switch and said switch means, means to compare the signal from one of said output terminals to the signal from the other of said output terminals of said video switch to obtain a difference signal, and means to display said difference signal.

15. A system for determining the sphericity of particles in the atmosphere comprising transmitter means generating radiant energy, antenna means receiving said radiant energy from said transmitter means and operating to radiate right circularly polarized energy toward said atmosphere, said antenna means also receiving right and left circularly polarized return echoes from said particles in said atmosphere, means to direct said right polarized return echoes through a first path and said left circularly polarized return echoes through a second path, switch means in each of said paths to alternately feed said right and left circularly polarized return echoes to receiver means, a video amplifier interconnecting said receiver means and a video switch, said video switch having one input terminal and two output terminals, said video amplifier being range gated, means to synchronize said switch means and said video switch, a first integrator connected to one of said output terminals and a second integrator connected to the other of said output terminals of said video switch, means to subtract the output from said first integrator from the output of said second integrator to obtain a difference signal, and means to measure said difference signal to determine the sphericity of said articles.

References Cited by the Examiner

UNITED STATES PATENTS

| | | | |
|---|---|---|---|
| 2,758,298 | 8/1956 | Sunstein | 343—5 |
| 2,851,681 | 9/1958 | Cohn | 343—5 |
| 2,911,640 | 11/1959 | Atlas | 343—5 X |
| 3,013,266 | 12/1961 | Wheeler | 343—5 X |
| 3,049,703 | 8/1962 | Davis | 343—5 |

CHESTER L. JUSTUS, *Primary Examiner.*

R. D. BENNETT, *Assistant Examiner.*